(12) United States Patent
Traficante et al.

(10) Patent No.: US 10,172,298 B1
(45) Date of Patent: Jan. 8, 2019

(54) GARDEN PLANTING GUIDE/IRRIGATION SYSTEM

(76) Inventors: Thomas Russell Traficante, Wellington, FL (US); Theresa Ann Traficante, Wellington, FL (US)

( * ) Notice: Subject to any disclaimer, the term of this patent is extended or adjusted under 35 U.S.C. 154(b) by 843 days.

(21) Appl. No.: 13/429,313

(22) Filed: Mar. 23, 2012

Related U.S. Application Data

(60) Provisional application No. 61/518,354, filed on May 4, 2011.

(51) Int. Cl.
    *A01G 1/00*      (2006.01)
    *A01G 9/28*      (2018.01)

(52) U.S. Cl.
    CPC ...................... *A01G 9/28* (2018.02)

(58) Field of Classification Search
    CPC .... A01G 25/00; A01G 25/06; A01G 13/0268; A01G 27/005; A01G 25/02; A01G 27/001; A01G 31/02; A01G 9/00; A01G 13/0256; A01G 1/002; A01G 25/165; A01G 9/247
    USPC ................... 43/48.5, 21.1; 47/48.5, 21.1
    See application file for complete search history.

(56) References Cited

U.S. PATENT DOCUMENTS

| | | | |
|---|---|---|---|
| 632,795 A | 9/1899 | Stoddart | |
| 986,003 A | 3/1911 | Von Hohenstein | |
| 1,914,850 A | 6/1933 | Foster | |
| 2,075,590 A * | 3/1937 | North | 405/48 |
| 2,223,360 A * | 12/1940 | Ellis | 47/79 |
| 2,240,611 A * | 5/1941 | Derdeyn | 239/267 |
| 2,771,320 A | 11/1956 | Korwin | |
| 3,567,134 A * | 3/1971 | Smith | 239/547 |
| 3,727,841 A * | 4/1973 | Hengesbach | 239/145 |
| D232,089 S * | 7/1974 | Margrill | D23/214 |
| 3,906,667 A | 9/1975 | Williams | |
| D241,542 S * | 9/1976 | Thurston | D23/214 |
| 4,212,134 A | 7/1980 | Brokamp | |
| 4,420,902 A | 12/1983 | Rayner | |
| 4,562,963 A * | 1/1986 | Butler | 239/273 |
| D315,780 S * | 3/1991 | Hengesbach | D23/213 |
| D321,746 S * | 11/1991 | Cockman | D23/221 |
| 5,168,678 A | 12/1992 | Scott, Jr. et al. | |
| 5,172,515 A | 12/1992 | Lapshansky, Sr. et al. | |
| 5,232,159 A * | 8/1993 | Abbate et al. | 239/276 |
| 5,685,488 A | 11/1997 | Gwartney | |

(Continued)

FOREIGN PATENT DOCUMENTS

EP      87663 A1 *    9/1983

OTHER PUBLICATIONS

"How to Build a Drip Irrigation System" Posted on May 15, 2009 by Emily http://www.mysquarefootgarden.net/drip-irrigation/.*

(Continued)

*Primary Examiner* — Joshua J Michener
*Assistant Examiner* — George Andonyan
(74) *Attorney, Agent, or Firm* — Darrow Mustafa PC

(57) ABSTRACT

Disclosed is a garden planting guide/irrigation system. It serves as simple planting guide assembled in a grid formation creating individual squares to allow planting of one or several plants per square, while surrounding and irrigating plants at their base. This pre-assembled, ready-to-use system connects to an existing pressurized fluid source, and then irrigates by delivering fluid to various points throughout the grid patterned tubing which have a plurality of fluid distribution openings spaced in pre-defined intervals surrounding each planting.

10 Claims, 4 Drawing Sheets

(56) References Cited

U.S. PATENT DOCUMENTS

| | | | |
|---|---|---|---|
| 5,956,893 A * | 9/1999 | Harrison | 47/39 |
| 6,394,368 B1 | 5/2002 | Hintz | |
| 6,453,607 B1 * | 9/2002 | Dewey | 47/48.5 |
| D469,848 S * | 2/2003 | Funk | D23/214 |
| 6,779,744 B1 * | 8/2004 | Marine et al. | 239/536 |
| 7,941,971 B2 | 5/2011 | Tamir | |
| 2004/0088917 A1 * | 5/2004 | Chambers | 47/58.1 SC |
| 2007/0144065 A1 * | 6/2007 | Lowe | 47/21.1 |
| 2011/0088315 A1 * | 4/2011 | Donoghue | 47/48.5 |

OTHER PUBLICATIONS

"PVC Irrigation System, Automatic Water Timers, and Rain Barrel System" Uploaded on Mar. 27, 2010 by bsntechdotcom, Brian Spraker http://www.youtube.com/watch?v=XLWm21GvyRM.*

* cited by examiner

GARDEN PLANTING GUIDE/IRRIGATION SYSTEM

FIELD OF THE INVENTION

The present instant invention relates to garden planting guides and fluid distributing devices and more particularly pertains to a garden watering system for surrounding and watering garden plants while reducing the amount of water lost to evaporation.

BACKGROUND OF THE INVENTION

The use of fluid distributing devices is known in the prior art. More specifically, fluid distributing devices heretofore devised and utilized are known basically of familiar, expected and obvious structural configurations, notwithstanding the myriad of designs encompassed by crowded prior at which have been developed for the fulfillment of countless objectives and requirements.

Known prior art fluid distributing devices include U.S. Pat. No. 5,232,159; U.S. Pat. No. 5,168,678; U.S. Pat. No. 4,420,902, U.S. Pat. No. 4,212,134; U.S. Pat. No. 6,394,368, U.S. Pat. No. 5,685,488.

While these devices fulfill their respective, particular objectives and requirements, the aforementioned patents do not disclose a garden watering system for surrounding and watering plants just at the base of plants while also providing a planting guide grid.

SUMMARY OF INVENTION

The garden planting guide/irrigation system according to the present invention substantially departs from the conventional concepts and designs of prior art, and in doing so provides an apparatus primarily developed for the purpose of providing a planting guide grid while surrounding and irrigating garden plants. The present invention is a planting guide and irrigation system that provides fluid substantially only to the base of plants in the garden while reducing the amount of fluid lost to evaporation.

In view of the foregoing disadvantages inherent in the known types of fluid distributing devices now present in the prior art, the present invention provides a new garden planting guide and irrigation system constructed as one wherein the same can be utilized for surrounding and watering garden plants.

The general purpose of the present invention, which will be described subsequently in greater detail, is to provide a new garden planting guide/irrigation system apparatus and method which has many of the advantages of the fluid distributing devices mentioned heretofore and many novel features that result in a new garden planting guide/irrigation system which is not anticipated, rendered obvious, suggested, or even implied by any prior art fluid distribution devices, either alone or in any combination thereof.

To attain this, the present invention generally comprises a garden planting guide and a system for surrounding and watering garden plants. The inventive device includes tubing fluidly connected to create a grid patterned planting guide, the tubing is perforated in such a manner as to provide fluid distribution around the base of plants.

The invention is comprised of equally spaced, perforated tubes arranged in a grid pattern in which plants or groups of plants are planted within. Pressurized fluid enters the grid of tubes from a supply line and exits each perforation thus irrigating each plant or group of plants within the grid.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and the terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from the cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new garden planting guide/irrigation system apparatus and method which has many advantages of the garden watering systems or irrigation devices mentioned heretofore and many novel features that result in a new garden planting guide/irrigation system which is not anticipated, rendered obvious, suggested, or even implied by any of the prior art fluid distributing devices, either alone or in any combination thereof.

Another object of the present invention is to provide a new garden planting guide/irrigation system that is a ready-to-use product.

It is another object of the present invention to provide a new garden planting guide/irrigation system which may be easily and efficiently manufactured and marketed.

It is further object of the present invention to provide a new garden planting guide/irrigation system which is of durable and reliable construction.

An even further object of the present invention is to provide a new garden planting guide/irrigation system which is susceptible of low cost manufacture with regard to both materials and labor, which accordingly is then susceptible to low prices of sale to the consuming public, thereby making such garden planting guide/irrigation system economically available to the buying public.

Still yet another object of the present invention is to provide a new garden planning guide/irrigation system which provides in the apparatuses and methods of the prior art some of the advantages thereof, while simultaneously overcoming some of the disadvantages normally associated therewith.

Still another object of the present invention is to provide a new garden planting guide/irrigation system for surrounding and watering garden plants.

Yet another object of the present invention is to provide a new garden planting guide/irrigation system which includes an assembly having a perforated conduit patterned into a grid for putting in a garden prior to planting, which has a fluid inlet permitting coupling of the conduit to a fluid supply line such that pressurized fluid can emit through the dispensing apertures onto the surrounded plant and the plurality of outlets about the perimeter conduit for permitting fluid coupling of a plurality of assemblies together.

These together with other objects of the invention, along with the various features of novelty which characterize the invention, are pointed out with particularity in the claims annexed to and forming the part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
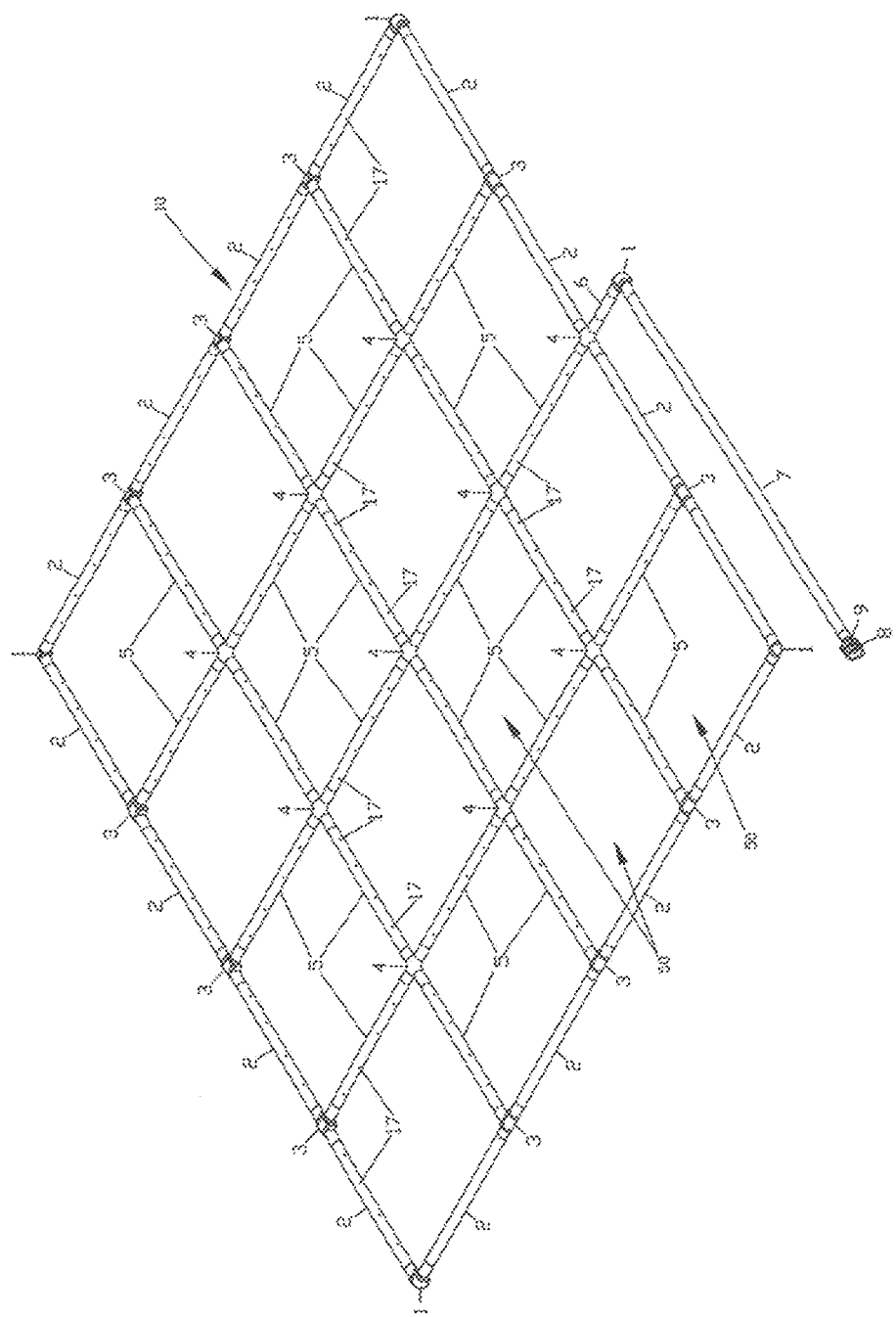
FIG. 1 is an example of a garden planting guide/irrigation system.

The present invention is a garden planting guide/irrigation system that provides fluid substantially only to the base of plants, reducing the amount of fluid lost to evaporation.

The principals and operation of an irrigation system according to the present invention may be better understood with the reference to the drawings and the accompanying description.

With reference now to the drawings, and in particular to FIGS. 1 through 4 illustrates a garden planting guide/irrigation system numeral 10. The garden planting guide/irrigation system 10 generally consists of hollow perimeter tube 2 perforated on the inner side, hollow interior grid tube 5 perforated on both sides, a hollow water supply tube 7, and a garden hose connector fitting 9. The perimeter tubes 2 and the interior grid tubes 5 can be located substantially within a single plane, as is shown in FIGS. 1-4. That is, a single plane can pass through a portion of all fluid discharge tubes (e.g. perimeter tubes 2 and interior grid tubes 5) of the planting guide/irrigation system 10. Alternatively or in addition, all fluid discharge tubes (e.g. perimeter tubes 2 and interior grid tubes 5) of the planting guide/irrigation system 10 can be substantially directly supported on a single plane.

Referring to FIG. 1, the perimeter tube 2 is connected to another perimeter tube 2 with tee fitting 3 while on the length and width, and the perimeter tube 2 is connected to another perimeter tube 2 with an elbow fitting 1 while on the corner.

Also referring to FIG. 1, the grid tube 5 is connected to another grid tube 5 with a cross fitting 4, the grid tube 5 connects to perimeter tube 2 at the tee fitting 3.

Again referring to FIG. 1, the perimeter tube 2 connects to water supply connector tube 6 with cross fitting 4. Water supply connector 6 connects to water supply tube 7 with elbow fitting 1. Water supply tube 7 connects to swivel garden hose connector 8 with garden hose connector fitting 9.

Figure 2:
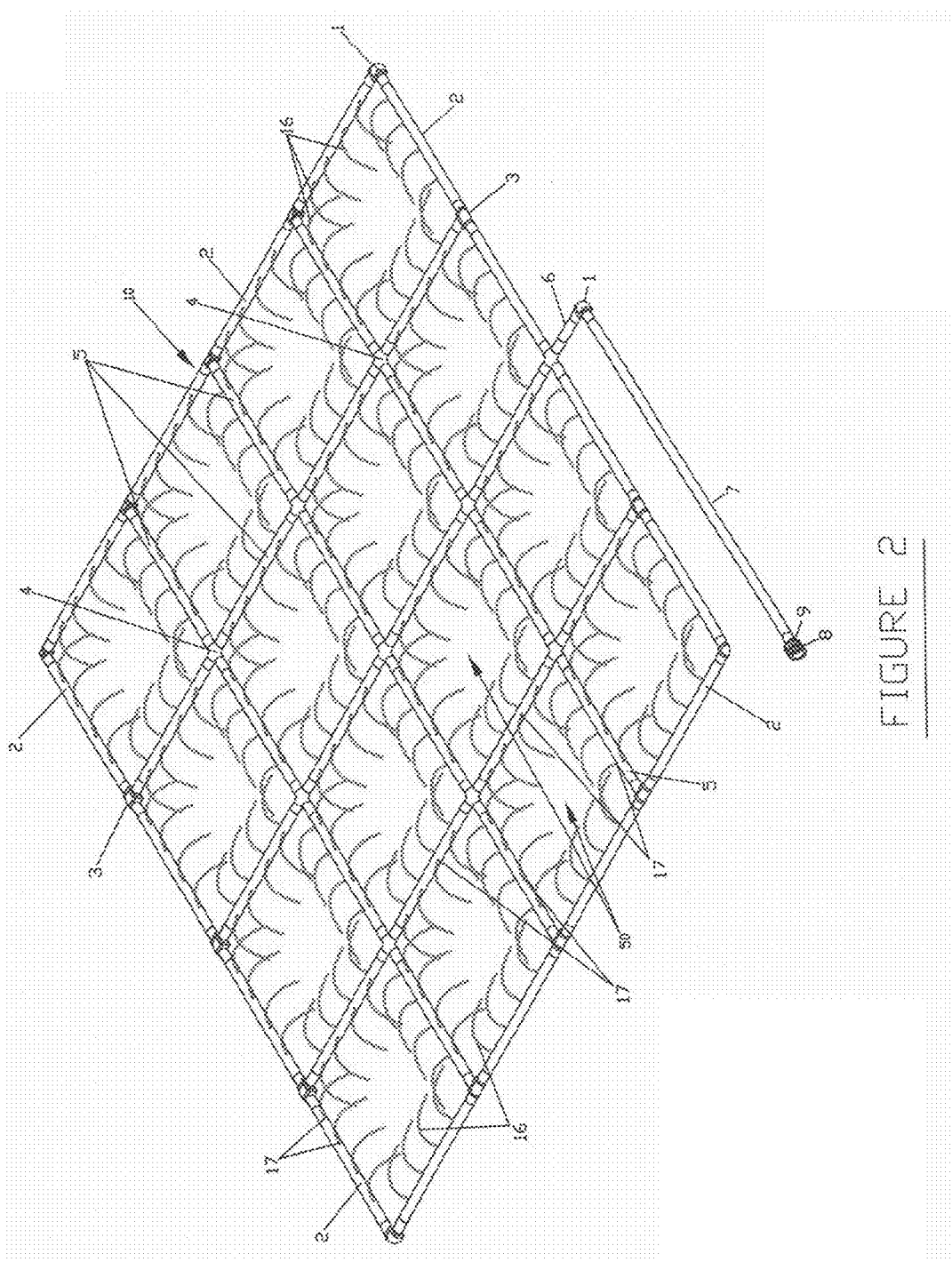
FIG. 2 shows the garden planting guide/irrigation system with water flowing from perforated tubes of the system.
Figure 3:
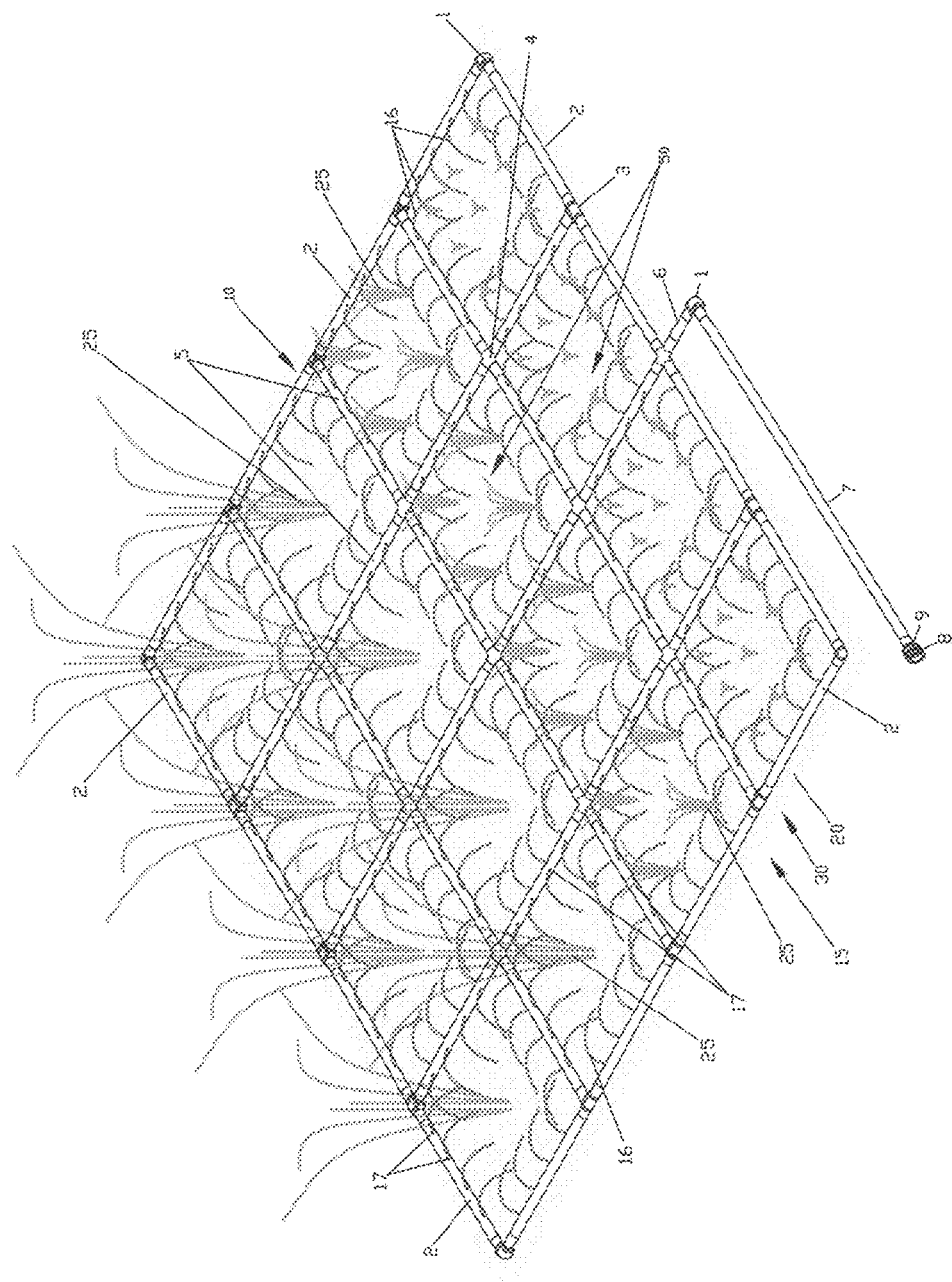
FIG. 3 shows an example of the garden planting guide/irrigation system being used in connection with a ground level garden.
Figure 4:
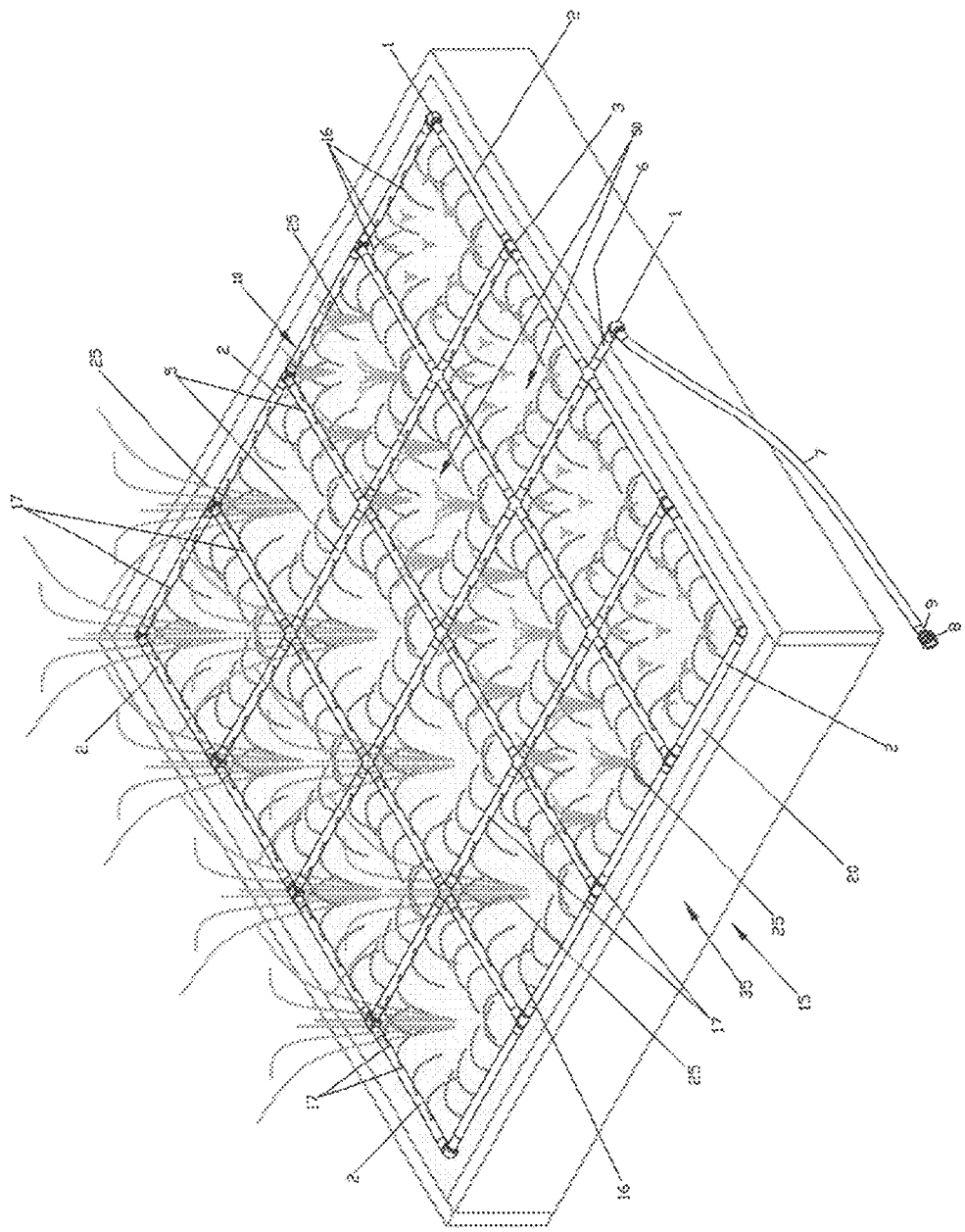
FIG. 4 shows an example of the garden planting guide/irrigation system being used in connection with a raised garden.

The garden planting guide/irrigation system 10 is placed in a garden 15 prior to planting. The garden 15 can include a surface 20 upon which the garden planting guide/irrigations system 10 is supported. The garden planting guide/irrigation system 10 can define a plurality of planting guide/irrigation zones 50, which can be arranged in a grid pattern. The planting guide/irrigation zones 50 can be substantially rectangular in shape and, more particularly, substantially square in shape, as is shown in FIGS. 1-4. One or more plants 25, depending on size, are planted in each square, FIGS. 3 through 4. Once planting is complete, a garden hose is connected to the garden hose connector 8. After turning the water supply on, fluid 16 will flow from each tube, as is shown in FIG. 2 through 4. Referring to FIG. 1 through 4, the perimeter tubes 2 are designed to only allow fluid to flow out of one side of the tube, towards the inside of the unit, thus preventing watering of the surrounding areas outside of the garden, and the grid tubes 5 are designed to allow fluid to flow out of both sides of the tube. Fluid 16 can exit the perimeter tubes 2 and the grid tubes 5 can be through fluid distribution openings (e.g. perforations 17 provided in perimeter tubes 2 and interior grid tubes 5). The unit can be used in a ground level garden 30 (see FIG. 3) or a raised garden 35 (see FIG. 4). If the unit is used in a raised garden 35, the water supply tube 7 can be rotated at the water supply connector tube 6 until the garden hose connector 8 is at ground level.

As to a further discussion of the manner of usage and operation of the present invention the same should be apparent from the above description. Accordingly, no further discussion relating to the manner of usage and operations will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the invention.

Therefore, the foregoing is considered as illustrative only of the principals of the invention. Further, it is understood that various omissions, substitutions and changes in the forms and details of the device illustrated and in its operation can readily occur to those skilled in the art, it is not desired to limit the invention to the exact construction and operation shown and described, and accordingly, all suitable modifications and equivalents may be resorted to, falling within the scope of, without departing from the spirit of, the invention.

What is claimed is:

1. A garden planting guide/irrigation system for distributing fluid at soil level to a base of one or more plants, the system comprising:

a frame including one or more hollow tubular members configured to form a plurality of separate square zones arranged in a grid pattern, each of the square zones being substantially enclosed by one or more of the hollow tubular members, the one or more hollow tubular members including a perimeter tubing, the perimeter tubing including perforations on only one side thereof such that the perforations face inward toward a respective one or more of the square zones;

each of the one or more hollow tubular members having a plurality of perforations therein, each of the perforations being located on a zone-facing inner side of a respective tubular member and being oriented inwardly toward a respective one or more of the square zones to permit a fluid received in the frame to be discharged therefrom through the perforations and into the respective one or more of the square zones, whereby fluid is supplied to one or more plants located within a respective one or more of the square zones, the frame being located substantially within a single plane; and a hollow non-perforated tube connected in fluid communication with and extending from the frame, the hollow non-perforated tube being configured for connection to a pressurized fluid source via a coupling.

2. A garden planting guide/irrigation system for distributing fluid at soil level to a base of one or more plants, the system comprising:

a frame including one or more hollow tubular members configured to form a plurality of separate square zones arranged in a grid pattern, each of the square zones being substantially enclosed by one or more of the hollow tubular members, the one or more hollow tubular members including an interior grid tubing, the interior grid tubing including a plurality of perforations on opposing sides thereof such that the perforations on one side face inward toward one or more of the plurality of square zones and such that the perforations on the other side face inward toward a different one or more of the plurality of square zones;

each of the one or more hollow tubular members having a plurality of perforations therein, each of the perforations being located on a zone-facing inner side of a respective tubular member and being oriented inwardly toward a respective one or more of the square zones to permit a fluid received in the frame to be discharged therefrom through the perforations and into the respective one or more of the square zones, whereby fluid is supplied to one or more plants located within a respective one or more of the square zones, the frame being located substantially within a single plane; and a hollow non-perforated tube connected in fluid communication with and extending from the frame, the hollow non-perforated tube being configured for connection to a pressurized fluid source via a coupling.

3. A garden planting guide/irrigation system for distributing fluid at soil level to a base of one or more plants, the system comprising:

a frame including one or more hollow tubular members configured to form a plurality of separate square zones arranged in a grid pattern, each of the square zones being substantially enclosed by one or more of the hollow tubular members, each of the one or more hollow tubular members having a plurality of perforations therein, each of the perforations being located on a zone-facing inner side of a respective tubular member and being oriented inwardly toward a respective one or more of the square zones to permit a fluid received in the frame to be discharged therefrom through the perforations and into the respective one or more of the square zones, whereby fluid is supplied to one or more plants located within a respective one or more of the square zones, the frame being located substantially within a single plane; and a hollow non-perforated tube connected in fluid communication with and extending from the frame, the hollow non-perforated tube being configured for connection to a pressurized fluid source via a coupling, the hollow non-perforated tube including a fluid supply tube connected at one end in fluid communication with the frame, the fluid supply tube being configured at an opposite end for connection in fluid communication with the pressurized fluid source.

4. The garden planting guide/irrigation system of claim 3, wherein the fluid supply tube is configured to pivot left or right.

5. A system for distributing fluid at soil level to a base of one or more plants comprising:

a frame including one or more hollow tubular members defining a plurality of separate zones arranged in a grid pattern, the separate zones being substantially rectangular, each of the separate zones being substantially enclosed by one or more of the hollow tubular members, each of the one or more hollow tubular members having a plurality of perforations therein, each of the perforations being located on a zone-facing inner side of a respective tubular member and being oriented inwardly toward a respective one or more of the separate zones to permit a fluid received in the frame to be discharged therefrom through the perforations and into the respective one or more of the separate zones, whereby at least a portion of the fluid is supplied to one or more plants located within a respective one or more of the separate zones, the frame being located substantially within a single plane.

6. The system of claim 5, wherein the separate zones are substantially square.

7. A system for distributing fluid at soil level to a base of one or more plants comprising:

a frame including one or more hollow tubular members defining a plurality of separate zones arranged in a grid pattern, the plurality of separate zones being substantially identical in at least one of a size or a shape, each of the separate zones being substantially enclosed by one or more of the hollow tubular members, each of the one or more hollow tubular members having a plurality of perforations therein, each of the perforations being located on a zone-facing inner side of a respective tubular member and being oriented inwardly toward a respective one or more of the separate zones to permit a fluid received in the frame to be discharged therefrom through the perforations and into the respective one or more of the separate zones, whereby at least a portion of the fluid is supplied to one or more plants located within a respective one or more of the separate zones, the frame being located substantially within a single plane.

8. A system for distributing fluid at soil level to a base of one or more plants comprising:

a frame including one or more hollow tubular members defining a plurality of separate zones arranged in a grid pattern, each of the separate zones being substantially enclosed by one or more of the hollow tubular members, each of the one or more hollow tubular members having a plurality of perforations therein, each of the perforations being located on a zone-facing inner side of a respective tubular member and being oriented inwardly toward a respective one or more of the separate zones to permit a fluid received in the frame to be discharged therefrom through the perforations and into the respective one or more of the separate zones, whereby at least a portion of the fluid is supplied to one or more plants located within a respective one or more of the separate zones, the frame being located substantially within a single plane; and a fluid supply tubing, the fluid supply tubing being connected at one end in fluid communication with the frame.

9. A system for distributing fluid at soil level to a base of one or more plants comprising:

a frame including one or more hollow tubular members defining a plurality of separate zones arranged in a grid pattern, each of the separate zones being substantially enclosed by one or more of the hollow tubular members, each of the one or more hollow tubular members having a plurality of perforations therein, each of the perforations being located on a zone-facing inner side of a respective tubular member and being oriented inwardly toward a respective one or more of the separate zones to permit a fluid received in the frame to be discharged therefrom through the perforations and into the respective one or more of the separate zones, whereby at least a portion of the fluid is supplied to one or more plants located within a respective one or more of the separate zones, the frame being located substantially within a single plane, the one or more hollow tubular members including a perimeter tubing, the perimeter tubing including perforations on only one side thereof such that the perforations face inward toward one or more of the separate zones.

10. A system for distributing fluid at soil level to a base of one or more plants comprising:

a frame including one or more hollow tubular members defining a plurality of separate zones arranged in a grid pattern, each of the separate zones being substantially enclosed by one or more of the hollow tubular members, each of the one or more hollow tubular members having a plurality of perforations therein, each of the perforations being located on a zone-facing inner side of a respective tubular member and being oriented inwardly toward a respective one or more of the separate zones to permit a fluid received in the frame to be discharged therefrom through the perforations and into the respective one or more of the separate zones, whereby at least a portion of the fluid is supplied to one or more plants located within a respective one or more of the separate zones, the frame being located substantially within a single plane, the one or more hollow tubular members including an interior grid tubing, the interior grid tubing including perforations on opposing sides thereof such that the perforations on one side face inward toward one or more of the plurality of separate zones and such that the perforations on the other side face inward toward a different one or more of the plurality of separate zones.

* * * * *